United States Patent
He et al.

(10) Patent No.: US 11,791,461 B2
(45) Date of Patent: Oct. 17, 2023

(54) COMPOSITE SILICON NEGATIVE ELECTRODE MATERIAL, PREPARATION METHOD AND USE

(71) Applicant: BTR NEW MATERIAL GROUP CO., LTD, Guangdong (CN)

(72) Inventors: Peng He, Guangdong (CN); Sheng Li, Guangdong (CN); Min Yue, Guangdong (CN); Eming Guo, Guangdong (CN)

(73) Assignee: BTR NEW MATERIAL GROUP CO., LTD., Shenzhen (CN)

( * ) Notice: Subject to any disclaimer, the term of this patent is extended or adjusted under 35 U.S.C. 154(b) by 176 days.

(21) Appl. No.: 16/062,910

(22) PCT Filed: Sep. 22, 2016

(86) PCT No.: PCT/CN2016/099768
§ 371 (c)(1),
(2) Date: Jun. 15, 2018

(87) PCT Pub. No.: WO2017/113897
PCT Pub. Date: Jul. 6, 2017

(65) Prior Publication Data
US 2018/0375094 A1    Dec. 27, 2018

(30) Foreign Application Priority Data
Dec. 31, 2015    (CN) .......................... 201511026642.X

(51) Int. Cl.
*H01M 4/38* (2006.01)
*H01M 4/48* (2010.01)
(Continued)

(52) U.S. Cl.
CPC .......... *H01M 4/386* (2013.01); *C01B 33/021* (2013.01); *H01M 4/0471* (2013.01);
(Continued)

(58) Field of Classification Search
CPC .. H01M 4/368; H01M 4/0471; H01M 4/1395; H01M 4/366; H01M 4/38;
(Continued)

(56) References Cited

U.S. PATENT DOCUMENTS

| | | | |
|---|---|---|---|
| 2005/0042128 A1 | 2/2005 | Matsubara et al. | |
| 2009/0191463 A1 | 7/2009 | Ide et al. | |

(Continued)

FOREIGN PATENT DOCUMENTS

| | | |
|---|---|---|
| CN | 1591938 A | 3/2005 |
| CN | 101485013 A | 7/2009 |

(Continued)

OTHER PUBLICATIONS

CN102122708A Zhong Espacenet translation (Year: 2011).*
(Continued)

*Primary Examiner* — Brittany L Raymond
(74) *Attorney, Agent, or Firm* — TUCKER ELLIS LLP

(57) ABSTRACT

Disclosed is a composite silicon negative electrode material. The composite silicon negative electrode material comprises a nano silicon (1), a nano composite layer (5) coated on the surface of the nano silicon, and a conductive carbon layer (4) uniformly coated outside the nano composite layer (5). The nano composite layer (5) is a silicon oxide (2) and a metal alloy (3). In the composite silicon negative electrode material with a three-layer structure, the nano composite layer (5), composed of the silicon oxide (2) and the metal alloy (3) coated on the surface of the silicon oxide (2), effectively reduces the volume expansion of the nano silicon (1), maintains the characteristic of high conductivity of the silicon material, improves the mobility of lithium ions, prevents direct contact between a silicon negative electrode and an electrolyte, and can form a hard SEI film on the surface of the composite silicon negative electrode material, (Continued)

thereby allowing the cycle performance of the material to be greatly enhanced. The composite silicon negative electrode material has the characteristics of a high capacity, long cycle life and high conductivity. A preparation process for the silicon negative electrode material is simple, easily controllable, and suitable for industrial production.

18 Claims, 4 Drawing Sheets

(51) Int. Cl.
  *H01M 4/1395* (2010.01)
  *H01M 4/62* (2006.01)
  *H01M 4/04* (2006.01)
  *C01B 33/021* (2006.01)
  *H01M 4/36* (2006.01)
  *H01M 4/02* (2006.01)
  *H01M 10/0525* (2010.01)

(52) U.S. Cl.
  CPC ......... *H01M 4/1395* (2013.01); *H01M 4/366* (2013.01); *H01M 4/38* (2013.01); *H01M 4/483* (2013.01); *H01M 4/625* (2013.01); *H01M 10/0525* (2013.01); *H01M 2004/027* (2013.01)

(58) Field of Classification Search
  CPC .. H01M 4/483; H01M 4/625; H01M 10/0525; H01M 2004/027; H01M 4/485; H01M 4/626; H01M 4/386; H01M 4/48; H01M 4/583; C01B 33/021; C01B 32/05; C01B 33/02; C01B 33/113; Y02E 60/10; B22F 1/0085; B22F 9/04
  See application file for complete search history.

(56) References Cited

U.S. PATENT DOCUMENTS

| | | | |
|---|---|---|---|
| 2010/0243964 A1 | 9/2010 | Lee et al. | |
| 2015/0086870 A1* | 3/2015 | Fukasawa | H01M 4/131 |
| | | | 429/218.1 |
| 2016/0006024 A1* | 1/2016 | Xiao | H01M 4/622 |
| | | | 429/332 |
| 2016/0315311 A1* | 10/2016 | Jeon | H01M 4/131 |

FOREIGN PATENT DOCUMENTS

| | | | | |
|---|---|---|---|---|
| CN | 101777651 A | | 7/2010 | |
| CN | 102122708 A | | 7/2011 | |
| CN | 102365774 | * | 2/2012 | |
| CN | 102365774 A | | 2/2012 | |
| CN | 102479948 A | | 5/2012 | |
| CN | 102709563 A | | 10/2012 | |
| CN | 103594690 A | | 2/2014 | |
| CN | 103682279 | * | 3/2014 | |
| CN | 103915609 A | | 7/2014 | |
| CN | 104058404 A | | 9/2014 | |
| CN | 104380507 A | | 2/2015 | |
| CN | 105406050 A | | 3/2016 | |
| JP | 2007042393 A | | 2/2007 | |
| JP | 2007123100 A | | 5/2007 | |
| JP | 2015060776 A | | 3/2015 | |
| KR | 20100109483 A | | 10/2010 | |
| WO | WO-2015051309 A1 | * | 4/2015 | ............ H01M 4/134 |

OTHER PUBLICATIONS

Sim et al., "Critical Thickness of SiO2 Coating Layer on Core@Shell Bulk@Nanowire Si Anode Materials for Li-Ion Batteries" Advanced Materials, vol. 25, published Jun. 20, 2013, pp. 4498-4503 (Year: 2013).*
English translation of CN Publication 103682279, Mar. 2014.*
English translation of CN Publication 102365774, Feb. 2012.*
Y. Hu, et al.; Superior Storage Performance of A Si@SiOx/C Nanocomposite as Anode Material for Lithium-Ion Batteries; Angewandte Chemie Int.; ED. 2008, 47; pp. 1645-1649.
Office Action Issued for Corresponding Japanese Patent Application No. 2018-525686 dated Jun. 25, 2019.
Office Action Issued for Corresponding Chinese Patent Application No. 201511026642.X dated May 22, 2017.
Office Action Issued for Corresponding Korean Patent Application No. 10-2018-7009977 dated Jul. 1, 2019.
International Search Report corresponding to PCT/CN2016/099768, dated Dec. 27, 2016.
Written Opinion corresponding to PCT/CN2016/099768, dated Dec. 27, 2016.
Chinese Office Action from corresponding Chinese Application No. 201511026642.X, dated May 22, 2017, 5 pages.

* cited by examiner

COMPOSITE SILICON NEGATIVE ELECTRODE MATERIAL, PREPARATION METHOD AND USE

This application is filed under 35 U.S.C. § 371 to continue International App. No. PCT/CN2016/099768, filed Sep. 22, 2016, which claims the priority to Chinese App. No. 201511026642.X, filed on Dec. 31, 2015, both of which are incorporated herein by reference.

TECHNICAL FIELD

The present invention relates to a composite silicon anode material, a preparation method thereof, and a lithium ion battery prepared by using the anode material, and belongs to the field of anode materials for lithium ion battery and electrochemistry.

BACKGROUND ART

Lithium-ion batteries as energy storage devices have advantages such as high energy density, low self-discharge, wide operating voltage range, no memory effect, long service life, and no environmental pollution, and have been widely used in fields of 3C consumer electronics, energy storage and new energy vehicles etc. The key electrode material for a lithium-ion battery is an ultimate decisive factor of battery performances, and the anode material plays a crucial role in the improvement of performances of a lithium-ion battery. At present, the application of anode materials is mainly based on traditional graphite materials, but the specific capacity of graphite has been close to the theoretical value of 372 mAh/g, and there is hardly room for improvement. Therefore, development of other new anode materials to improve performances of a lithium battery has become a hot topic in the research field of anode materials.

Silicon has a theoretical specific capacity of 4200 mAh/g, which is much higher than the specific capacity of graphite materials, and a voltage platform which is slightly higher than that of graphite, and does not cause lithium precipitation on surface when charging, and thus has better safety performance. In addition, the source of silicon is extensive, and the storage of silicon is abundant. Thus, silicon is considered to be one of new anode materials which are most promising alternatives to graphite. However, silicon as an anode material for a lithium ion battery also has some obvious disadvantages.

Firstly, silicon itself has low conductivity and cannot be used directly as an anode. Secondly, silicon material has large change in volume during the use thereof (about 300%), which makes the material easy to be gradually pulverized, causing collapse of structure, eventually leading to detachment between electrode active substances and current collector and loss of electrical contact, leading to a significant reduction in cycle performance of the battery. In addition, due to this volume effect, it is difficult for silicon to form a stable solid electrolyte interface (SEI) film in the electrolyte. Along with the destruction of the electrode structure, new SEI film is continuously formed on the exposed surface of silicon, which exacerbates corrosion and capacity decay of silicon.

In order to solve the problems existing in the use of silicon materials, those skilled in the art would improve the conductivity of silicon and improve the volume expansion effect of silicon by surface modification, nanocrystallization, and alloying of silicon, and compounding of silicon with other materials.

CN101777651A disclose an anode material for lithium battery, which comprises an active substance silicon powder and a volume buffering agent silica, wherein the silicon is coated or partly coated on the surfaces of the silica particles. The anode material in this patent is prepared by mixing ultra-fine silica with carbon reducing agent and then sintering them at high temperature in vacuum. This method is difficult to prepare a dense active silicon layer through the reduction reaction of carbon and silica and the thickness of silicon layer is also difficult to control, resulting in significant deterioration of the cycle performance of the anode material and difficulty in controlling the capacity of the anode material.

CN102709563A discloses a silicon anode material for lithium ion battery, comprising nano silicon powder and a silica coating layer coated on the surface of the nano silicon. The silicon anode in this patent is prepared by dispersing nano silicon in a sodium silicate solution, adding graphite and inorganic acid to precipitate and coat on a copper foil, and then drying at 150° C. This method is difficult to ensure that silica was completely coated on the silicon surface, and graphite conductive network was only mechanically mixed in the silicon anode material, and therefore, it is also difficult to suppress the volume expansion during silicon cycle.

Technical solutions disclosed in CN101777651A and CN102709563A are to coat silicon on a buffer surface or coat a buffer layer on silicon surface. Although the volume expansion of silicon can be partly suppressed, the conductivity of silicon itself does not increase significantly, and thus long cycle life cannot be guaranteed.

Therefore, it is a technical difficulty to be urgently solved in the field of lithium ion batteries about how to achieve a uniform composite of nano silicon and a buffer layer, while ensuring that the silicon anode has higher conductivity, thereby preparing a silicon anode material having high specific capacity, low cycle expansion and long cycle life.

CONTENTS OF THE INVENTION

In view of the problems in the prior art, the first purpose of the present invention is to provide a composite silicon anode material, which comprises a nano silicon, a nano composite layer coated on the surface of the nano silicon, and a conductive carbon layer uniformly coated outside the nano composite layer;

The nano composite layer includes a silicon oxide layer and a metal alloy layer from inside to outside.

FIG. 1 is a structural schematic view of a composite silicon anode material provided by the present invention.

Preferably, the nano silicon has an average particle size of 1 nm to 500 nm, for example, 3 nm, 6 nm, 13 nm, 45 nm, 63 nm, 80 nm, 120 nm, 150 nm, 200 nm, 335 nm, 365 nm, 380 nm, 425 nm, 480 nm, etc.

Preferably, the nano silicon is any one selected from the group consisting of nano silicon crystals, nano silicon non-crystals, and a combination of at least two of them, preferably mono-dispersed nano silicon particles.

Preferably, in the composite silicon anode material, the content of nano silicon is in the range of 5 wt % to 85 wt %, for example 6 wt %, 16 wt %, 23 wt %, 18 wt %, 25 wt %, 34 wt %, 42 wt %, 46 wt %, 52 wt %, 68 wt %, 75 wt %, 80 wt %, 84 wt %, etc.

Preferably, in the composite silicon anode material, the content of conductive carbon is in the range of 5 wt % to 40 wt %, for example, 6 wt %, 16 wt %, 23 wt %, 18 wt %, 25 wt %, 34 wt %, 38 wt %, etc.

Preferably, the carbon of the conductive carbon layer includes any one selected from the group consisting of pyrolytic carbon, graphene, conductive carbon tube, carbon fiber, nano graphite, conductive carbon black, and a combination of at least two of them. Said combination typically includes but is not limited to a combination of pyrolytic carbon and graphene, a combination of conductive carbon tube and carbon fiber, a combination of nano graphite and conductive carbon black, a combination of graphene, conductive carbon tube and carbon fiber, etc.

Preferably, the nano composite layer has a thickness of 5 nm to 50 nm, for example, 6 nm, 10 nm, 15 nm, 22 nm, 26 nm, 30 nm, 36 nm, 42 nm, 48 nm, etc.

Preferably, the silicon oxide is $SiO_x$, wherein X is preferably in the range of 0.5 to 2.0, for example 0.6, 0.8, 1.0, 1.1, 1.3, 1.5, 1.7, 2.0, etc.

Preferably, the metal alloy is an alloy of metal elements and/or an alloy of a metal element and a non-metal element.

Preferably, the metal elements are any two selected from the group consisting of aluminum, titanium, nickel, tin, antimony, iron, copper, manganese, cobalt, germanium, zinc, bismuth, gallium, and a combination of at least three of them; the non-metal element is any one selected from the group consisting of silicon, nitrogen, and a combination of at least two of them.

The second purpose of the present invention is to provide a method for preparing the composite silicon anode material described in the first purpose, including the following steps:

(1) selecting nano silicon, carrying out heat treatment and homogeneous compounding treatment to obtain a first precursor;

(2) coating the first precursor with carbon to obtain a second precursor;

(3) carrying out modification post-treatment to the second precursor, and sintering to obtain a primary product of composite silicon anode material.

Optionally, step (3) is followed by step (4):

carrying out pulverization, sieving and demagnetization to the primary product of composite silicon anode material obtained in step (3) to obtain a composite silicon anode material having a median particle diameter of 0.5 μm to 20.0 μm.

Preferably, the heat treatment in step (1) is as follow: heat-treating the nano silicon in an oxidizing mixed gas.

Preferably, the oxidizing mixed gas is a mixed gas of oxygen gas and an inactive gas, and the inactive gas is any one selected from the group consisting of nitrogen gas, helium gas, argon gas, neon gas, and a combination of at least two of them.

Preferably, the temperature for heat treatment is in the range of 300° C. to 1200° C., for example 320° C., 360° C., 440° C., 480° C., 560° C., 630° C., 690° C., 750° C., 820° C., 960° C., 1020° C., 1100° C., etc., preferably 500° C. to 1000° C.

As a preferred embodiment, the homogeneous compounding treatment in step (1) is as follow: under a protective atmosphere, carrying out ball milling with a metal alloy, followed by heat treatment; the temperature for heat treatment is preferably in the range of 500° C. to 1500° C., for example 320° C., 360° C., 440° C., 480° C., 560° C., 630° C., 690° C., 750° C., 820° C., 960° C., 1020° C., 1100° C., 1250° C., 1365° C., 1450° C., etc.; and the protective atmosphere is preferably any one selected from the group consisting of nitrogen gas, helium gas, argon gas, neon gas, and a combination of at least two of them.

Preferably, the metal alloy is any two selected from the group consisting of silicon powder, aluminum powder, titanium powder, nickel powder, tin powder, tungsten powder, iron powder, copper powder, manganese powder, cobalt powder, germanium powder, zinc powder, magnesium powder, gallium powder, and a combination of at least three of them; preferably any two selected from the group consisting of silicon powder, aluminum powder, titanium powder, tin powder, zinc powder, iron powder, antimony powder, bismuth powder, and a combination of at least three of them.

Preferably, the ball milling is dry ball milling and/or wet ball milling, preferably dry ball milling; the dry ball milling is preferably carried out by any one of planetary ball mill, high speed stirring mill, tube mill, cone mill, rod mill, and sand mill.

As another preferred embodiment, the homogeneous compounding treatment in step (1) is as follow: under a reducing mixed atmosphere, mixing with the metal alloy and carrying out heat treatment.

Preferably, the metal alloy is any one selected from the group consisting of aluminum salt, titanium salt, iron salt, tin salt, copper salt, manganese salt, cobalt salt, germanium salts, zinc salt, magnesium salt, aluminum trioxide, titanium dioxide, tin dioxide, copper oxide, and a mixture of at least two of them; preferably any one selected from the group consisting of aluminum trichloride, titanium tetrachloride, copper chloride, tin tetrachloride, aluminum trioxide, titanium dioxide, tin dioxide, and a mixture of at least two of them.

Preferably, the reducing mixed atmosphere is a mixture of ammonia gas and an inactive gas; and the inactive gas is any one selected from the group consisting of nitrogen gas, helium gas, argon gas, neon gas, and a combination of at least two of them.

Preferably, the temperature for heat treatment is in the range of 500° C. to 1500° C., for example 320° C., 360° C., 440° C., 480° C., 560° C., 630° C., 690° C., 750° C., 820° C., 960° C., 1020° C., 1100° C., 1250° C., 1365° C., 1450° C., etc.

Preferably, the method for carbon coating in step (2) is gas phase coating, liquid phase coating or solid phase coating.

Preferably, the gas phase coating is as follow: introducing a carbon-source gas into a rotary furnace loaded with the first precursor, and depositing and coating the first precursor under rotating conditions.

Preferably, the carbon-source gas is any one selected from the group consisting of methane, ethane, propane, ethylene, acetylene, benzene, toluene, xylene, ethanol, acetone, and a mixture of at least two of them.

Preferably, in the gas phase coating, the rotational speed is in the range of 0.5 rpm to 10 rpm, for example, 0.8 rpm, 1.3 rpm, 1.8 rpm, 2.2 rpm, 2.9 rpm, 3.8 rpm, 4.4 rpm, 4.9 rpm, 5.5 rpm, 6.3 rpm, 7.4 rpm, 8.2 rpm, 9.2 rpm, 9.8 rpm, etc.; the introduced flow of the carbon-source gas is preferably methane, acetylene; the temperature for depositing and coating treatment is in the range of 600° C. to 1000° C., for example 620° C., 660° C., 690° C., 720° C., 780° C., 850° C., 920° C., 980° C., etc.

Preferably, the solid phase coating comprises: mixing a solid carbon source with the first precursor, and then performing carbonization to achieve the coating of the first precursor. The carbonization temperature is preferably in the range of 500° C. to 1200° C., for example, 320° C., 360° C., 440° C., 480° C., 560° C., 630° C., 690° C., 750° C., 820° C., 960° C., 1020° C., 1100° C., etc.

Preferably, the modification post-treatment in step (3) is selected from any one of fusion treatment, cold press treatment, hot press treatment, or isostatic press treatment; and is preferably carried out by a fusion machine, a forging press, a roller machine, an extruder, a punch press, or an isostatic press equipment.

Preferably, the sintering in step (3) is performed under a protective atmosphere which is preferably any one selected from the group consisting of nitrogen gas, helium gas, neon gas, argon gas, krypton gas, xenon gas, and a combination of at least two of them.

Preferably, the temperature for sintering in step (3) is in the range of 500° C. to 1200° C., for example 320° C., 360° C., 440° C., 480° C., 560° C., 630° C., 690° C., 750° C., 820° C., 960° C., 1020° C., 1100° C., etc.

The third purpose of the present invention is to provide a lithium ion battery comprising the composite silicon anode material described in the first purpose or a composite silicon anode material prepared by the method described in the second purpose.

Exemplarily, the lithium ion battery of the present invention is obtained by the following method:

the composite silicon anode material described in the first purpose, a conductive agent, a thickener and a binder in a mass percentage of (88-94):(1-4):(1-4):(1-4) are dissolved in a solvent to obtain a mixture; the mixture is coated on a copper foil current collector and dried in vacuum, to obtain an anode pole piece; then a lithium ion battery is assembled by a conventional production process using a cathode pole piece, an electrolyte, a separator, and a shell prepared by traditional mature processes.

Exemplarily, the conductive agent is preferably any one selected from the group consisting of graphite powder, acetylene black, carbon fiber, carbon nanotube, carbon black (SP), and a combination at least two of them; the thickener is preferably carboxymethyl cellulose sodium (CMC); the binder is preferably one selected from the group consisting of polyimide resin, acrylic resin, polyvinylidene fluoride, polyvinyl alcohol, carboxymethyl cellulose sodium, styrene butadiene rubber, and a combination of at least two of them; the cathode active material used for the cathode pole piece is one selected from the group consisting of ternary material, lithium-rich material, lithium cobaltate, lithium nickelate, spinel lithium manganate, laminated lithium manganate, lithium iron phosphate which are available on the market, and a combination of at least two of them; the type of the lithium ion battery is conventional aluminum shell, steel shell, or soft pack lithium ion battery.

Compared with the prior art, the present invention has the following beneficial effects:

(1) In the composite silicon anode material with a three-layered structure provided by the present invention, the nano composite layer, composed of the silicon oxide and the metal alloy coated on the surface of the silicon oxide, effectively reduces the volume expansion of the nano silicon, maintains the characteristic of high conductivity of the silicon material, improves the mobility of lithium ions, prevents direct contact between a silicon anode and an electrolyte, and can form a hard SEI film on the surface of the composite silicon anode material, thereby allowing the cycle performance of the material to be greatly enhanced. The composite silicon anode material of the present invention has the characteristics of high capacity (higher than 1500 mAh/g), long cycle life (capacity retention rate is above 90% after 300 cycles) and high conductivity.

(2) The preparation process for the composite silicon anode material provided by the present invention is simple, easily controllable, and suitable for industrial production.

DETAILED DESCRIPTION

In order to facilitate the understanding of the present invention, examples of the present invention are listed in the following. It should be understood by those skilled in the art that the examples are merely used to help understand the present invention, and should not be construed as specific limitations to the present invention.

Example 1

A composite silicon anode material is prepared by the following method:

(1) silicon powder having a median particle diameter of 50-80 nm was selected as nano silicon, and placed in a rotary furnace with a rotational speed of 20 r/min, and a gas mixture of argon gas and oxygen gas was introduced in a volume ratio of 1:0.5 at a gas flow rate of 0.5 L/min, then heat treatment was performed at 500° C. for 1 h to obtain primary heat-treated silicon powder;

The primary heat-treated silicon powder, bismuth powder and tin powder were mixed in a mass ratio of 100:5:5 and charged into a high-energy ball mill, and zirconium balls with a diameter of 0.5 mm were charged therein, and then a protective gas of argon gas was introduced, and high-energy ball milling was performed; wherein the rotational speed of ball mill is 3000 r/min, the mass ratio of the grinding balls and the powder was 10:1. After ball milling for 20 h, a ball-milled mixed powder was obtained. Then the ball-milled mixed powder was placed in a rotary furnace with a rotational speed of 50 r/min and was heated at 800° C. for 2 h with the introduction of argon gas to obtain a first precursor;

(2) The first precursor and asphalt powder with a particle size of 3 µm were proportioned at a mass ratio of 70:30, uniformly mixed and placed in a VC mixer with a frequency being adjusted to be 50 Hz and mixed for 60 minutes to obtain a second precursor;

(3) The second precursor was introduced to a fusion machine, the rotational speed of which was adjusted to 2000 rpm, fused for 5 h, and then placed in a high-temperature box-type furnace. A protective gas of nitrogen gas was introduced therein and the temperature was raised to 800° C.

The contents therein were kept at this temperature for 3 h and then cooled to room temperature, crushed, sieved and demagnetized to obtain a composite silicon anode material.

Figure 1:
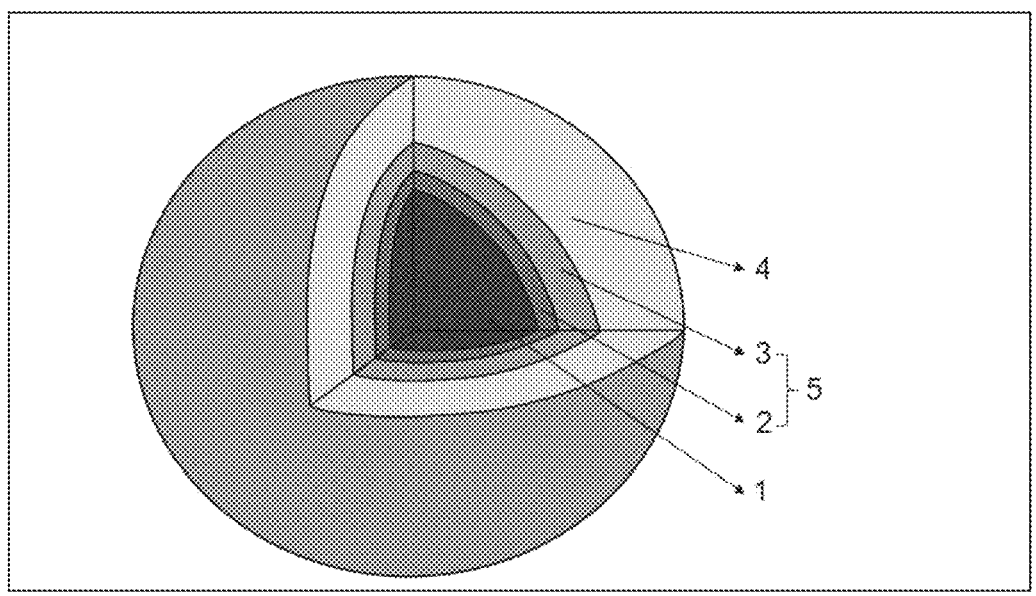
FIG. 1 is a schematic structural view of a composite silicon anode material provided by the present invention; wherein 1—nano silicon; 2—silicon oxide layer; 3—metal alloy layer; 4—conductive carbon layer; 5—nano composite layer.
Figure 2:
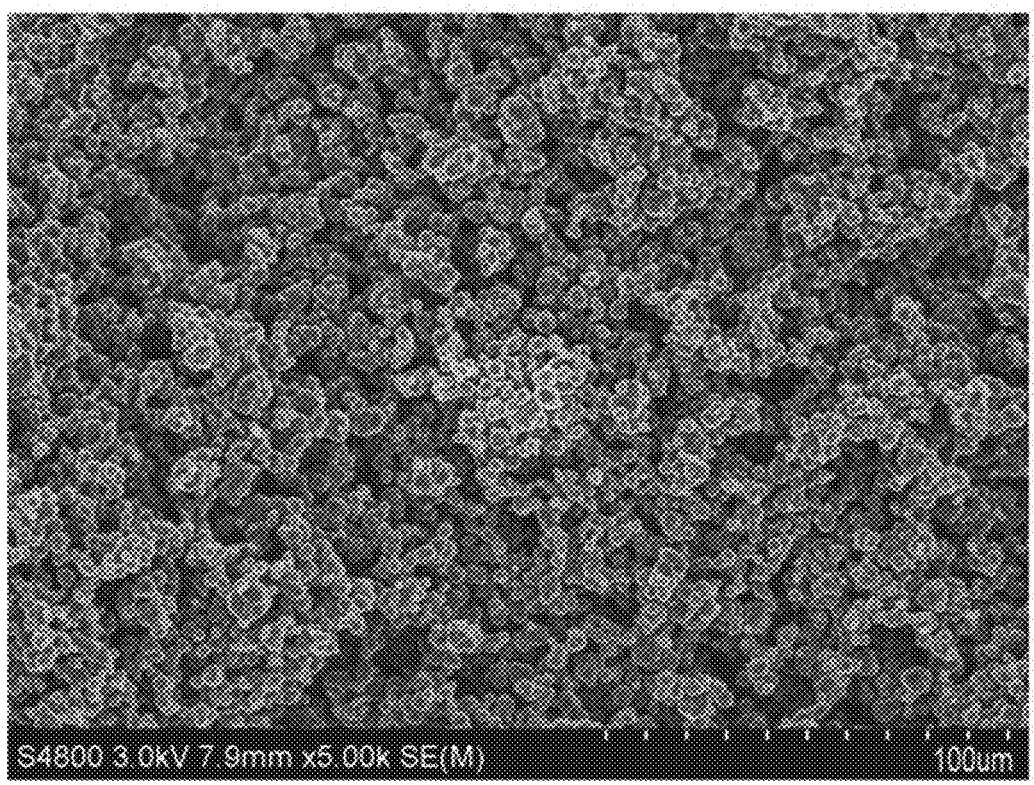
FIG. 2 is a scanning electron microscope (SEM) image of the composite silicon anode material prepared in Example 1.

FIG. 2 is a scanning electron microscope (SEM) image of the composite silicon anode material prepared in Example 1. From FIG. 2, it can be seen that the silicon composite anode material is uniformly distributed in a form of spherical-like particles, the particle size is relatively uniform, the median particle diameter is 5 μm, and the coating layer on particle surface is uniform and dense.

The nano silicon content of the composite silicon anode material prepared in Example 1 is 50 wt %, the thickness of the nano composite layer is 20 nm, and the nano composite layer is composed of $SiO_{1.5}$ and Bi—Sn alloy.

Application Example 1

The composite silicon anode material obtained in Example 1, a conductive agent and a binder in a mass percentage ratio of 94:1:5 were dissolved in a solvent to obtain a mixture, and the solid content was controlled at 50%. The obtained mixture was coated on a copper foil current collector and dried in vacuum to obtain an anode pole piece. Then a ternary cathode pole piece, 1 mol/L LiPF6/EC+DMC+EMC (v/v=1:1:1) electrolyte, a Celgard 2400 separator and a shell prepared by traditional mature processes were assembled using a conventional production process to obtain a 18650 cylindrical single battery.

Figure 3:
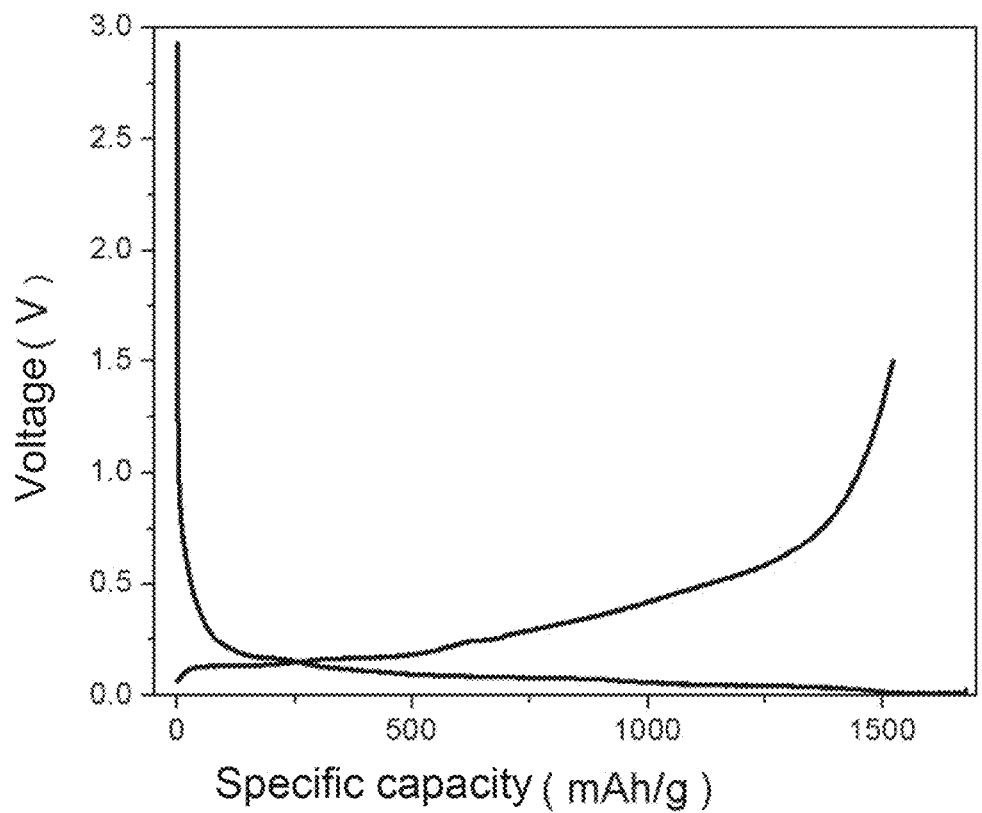
FIG. 3 is an initial charge-discharge curve of the composite silicon anode material prepared in Example 1.
Figure 4:
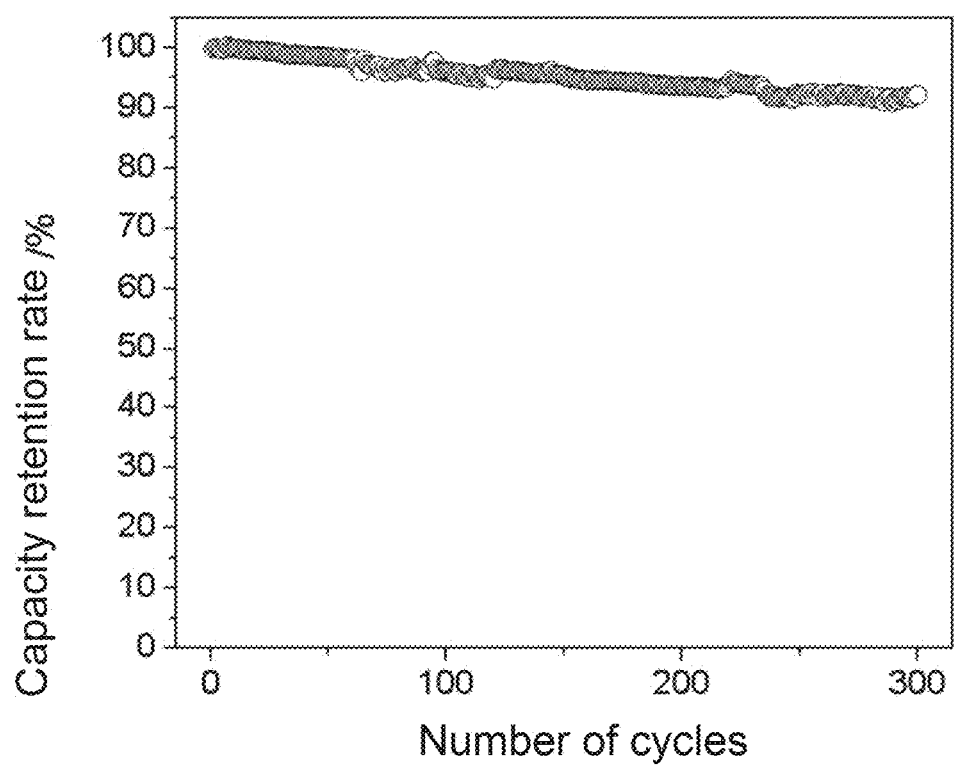
FIG. 4 is a cycle performance curve of the composite silicon anode material prepared in Example 1 of the present invention.

A charge-discharge test of the cylindrical single battery obtained in Application Example 1 is performed on the LAND battery test system of Wuhan Jinnuo Electronics Co., Ltd. under normal temperature condition, with 0.2C constant current for charging and discharging, and the charge-discharge voltage is limited to 2.75-4.2 V. FIG. 3 shows an initial charge-discharge curve of the composite silicon anode material prepared in Application Example 1. As can be seen from FIG. 3, the initial charge-discharge capacity of the material is high, and the reversible capacity is 1521.3 mAh/g. FIG. 4 shows a cycle performance curve of the composite silicon anode material prepared in Application Example 1. As can be seen from FIG. 4, the material has excellent cycle performance, and the capacity retention rate after 300 cycles is 92.1%.

Example 2

A composite silicon anode material is prepared by the following method:
(1) silicon powder having a median particle diameter of 150-200 nm was selected as nano silicon, and placed in a rotary furnace with a rotational speed of 20 r/min, and a gas mixture of oxygen gas and argon gas was introduced in a volume ratio of 1:1 at a gas flow rate of 2 L/min, then heat treatment was performed at 600° C. for 1 h to obtain primary heat-treated silicon powder;
The primary heat-treated silicon powder and titanium dioxide powder having a median particle diameter of 50 nm were mixed in a mass ratio of 100:10 and charged into a rotary furnace, and a gas mixture of ammonia gas and argon gas was introduced, then heat treatment was performed at 900° C. for 1 h to obtain a first precursor;
(2) The first precursor was placed in a rotary furnace with a rotational speed of 10 rpm/min, methane gas was introduced at a gas flow rate of 0.5 L/min, and gas-phase coating treatment was performed at 900° C. to obtain a second precursor;
(3) The second precursor was pressurized for 30 minutes under a pressure of 3000 kN and a pressure treatment temperature of 50° C., then placed in a high-temperature box-type furnace. A protective gas of nitrogen gas was introduced therein and the temperature was raised to 1000° C. The contents therein were kept at this temperature for 5 h and then cooled to room temperature, crushed, sieved and demagnetized to obtain a composite silicon anode material.

The composite silicon anode material prepared in Example 2 has a median particle diameter of 3 μm, a nano silicon content of 75 wt %, a thickness of nano composite layer of 40 nm, and the nano composite layer is composed of $SiO_2$ and Ti—N alloy.

Application Example 2

The composite silicon anode material in Application Example 1 was replaced with the composite silicon anode material obtained in Example 2.

Example 3

A composite silicon anode material is prepared by the following method:
(1) silicon powder having a median particle diameter of 1-30 nm was placed in a rotary furnace with a rotational speed of 30 r/min, and a gas mixture of neon gas and oxygen gas was introduced in a volume ratio of 1:0.1 at a gas flow rate of 0.8 L/min, then thermal oxidation treatment was performed at 1200° C. for 1 h to obtain primary heat-treated silicon powder;
The primary heat-treated silicon powder, aluminum powder and tin powder were mixed in a mass ratio of 100:5:5 and charged into a high-energy ball mill, and zirconium balls with a diameter of 1 mm were charged therein, and then a protective gas of argon gas was introduced, and high-energy ball milling was performed; wherein the rotational speed of ball mill is 2000 r/min, the mass ratio of the grinding balls and the powder was 50:1. After ball milling for 30 h, a ball-milled mixed powder was obtained. Then the ball-milled mixed powder was placed in a rotary furnace with a rotational speed of 20 r/min and was heated at 800° C. for 2 h with the introduction of argon gas to obtain a first precursor;
(2) The first precursor and phenolic resin powder with a particle size of 5 μm were proportioned at a mass ratio of 60:40, uniformly mixed and placed in a VC mixer with a frequency being adjusted to be 50 Hz and mixed for 30 minutes to obtain a second precursor;
(3) The second precursor was introduced to a fusion machine, the rotational speed of which was adjusted to 2000 rpm, fused for 2 h, then placed in a high-temperature box-type furnace. A protective gas of nitrogen gas was introduced therein and the temperature was raised to 1050° C. The contents therein were kept at this temperature for 2 h and then cooled to room temperature, crushed, sieved and demagnetized to obtain a composite silicon anode material.

The composite silicon anode material prepared in Example 3 has a median particle diameter of 1 μm, a nano silicon content of 35 wt %, a thickness of nano composite layer of 5 nm, and the nano composite layer is composed of $SiO_2$ and Al—Sn alloy.

Application Example 3

The composite silicon anode material in Application Example 1 was replaced with the composite silicon anode material obtained in Example 3.

Example 4

A composite silicon anode material is prepared by the following method:
  (1) silicon powder having a median particle diameter of 300-500 nm was selected as nano silicon, and placed in a rotary furnace with a rotational speed of 30 r/min, and a gas mixture of neon gas and oxygen gas was introduced in a volume ratio of 1:1 at a gas flow rate of 1 L/min, then thermal oxidation treatment was performed at 1000° C. for 2 h to obtain primary heat-treated silicon powder;
  The primary heat-treated silicon powder, aluminum powder and copper powder were mixed in a mass ratio of 100:10:10 and charged into a high-energy ball mill, and zirconium balls with a diameter of 5 mm were charged therein, and then a protective gas of argon gas was introduced, and high-energy ball milling was performed; wherein the rotational speed of ball mill is 5000 r/min, the mass ratio of the grinding balls and the powder was 30:1. After ball milling for 25 h, a ball-milled mixed powder was obtained. Then the ball-milled mixed powder was placed in a rotary furnace with a rotational speed of 10 r/min and was heated at 1500° C. for 2 h with the introduction of argon gas to obtain a first precursor;
  (2) The first precursor and asphalt powder with a particle size of 3 μm were proportioned at a mass ratio of 10:90, and dispersed in ethanol and spray dried to obtain a second precursor;
  (3) The second precursor was introduced to a fusion machine, the rotational speed of which was adjusted to 1000 rpm, fused for 1 h, then placed in a high-temperature box-type furnace. A protective gas of nitrogen gas was introduced therein and the temperature was raised to 1000° C. The contents therein were kept at this temperature for 1 h and then cooled to room temperature, crushed, sieved and demagnetized to obtain a composite silicon anode material.

The composite silicon anode material prepared in Example 4 has a median particle diameter of 10 μm, a nano silicon content of 5 wt %, a thickness of nano composite layer of 50 nm, and the nano composite layer is composed of $SiO_2$ and Al—Cu alloy.

Application Example 4

The composite silicon anode material in Application Example 1 was replaced with the composite silicon anode material obtained in Example 4.

Comparative Example 1

A composite silicon anode material is prepared in substantially the same manner as in Example 1, except that the primary heat-treated silicon powder is not subjected to ball milling heat treatment with aluminum powder and copper powder, that is, metal alloy coating treatment is not performed, and the primary heat-treated silicon powder is directly performed as the first precursor and used in later process.

Comparative Application Example 1

The composite silicon anode material in Application Example 1 was replaced with the composite silicon anode material obtained in Comparative Example 1.

Comparative Example 2

A composite silicon anode material was prepared in substantially the same manner as in Example 1, except that the first precursor was not mixed and subjected to heat treatment with asphalt powder, that is, carbon coating treatment was not performed.

Comparative Application Example 2

The composite silicon anode material in Application Example 1 was replaced with the composite silicon anode material obtained in Comparative Example 2.

Performance Test

The following method was used to test electrochemical cycle performance: the anode material, a conductive agent and a binder in a mass percentage ratio of 94:1:5 were dissolved in a solvent to obtain a mixture, and the solid content was controlled at 50%. The obtained mixture was coated on a copper foil current collector and dried in vacuum to obtain an anode pole piece. Then a ternary cathode pole piece, 1 mol/L LiPF6/EC+DMC+EMC (v/v=1:1:1) electrolyte, a Celgard 2400 separator and a shell prepared by traditional mature processes were assembled using a conventional production process to obtain a 18650 cylindrical single battery. A charge-discharge test of the cylindrical single battery was performed on the LAND battery test system of Wuhan Jinnuo Electronics Co., Ltd. under normal temperature condition, with 0.2C constant current for charging and discharging, and the charge-discharge voltage is limited to 2.75-4.2 V.

Performance test results are shown in Table 1;

TABLE 1

Performance Test Results of Examples and Comparative Examples

| Examples | | Initial reversible capacity (mAh/g) | Initial discharge capacity (mAh/g) | Initial Coulomb efficiency (%) | Capacity retention rate after 300 cycles (%) |
|---|---|---|---|---|---|
| Application Examples | 1 | 1521.3 | 1675.4 | 90.8 | 92.1 |
|  | 2 | 2271.0 | 2546.2 | 89.2 | 88.5 |
|  | 3 | 1103.2 | 1208.3 | 91.3 | 90.3 |
|  | 4 | 485.1 | 467.4 | 85.5 | 95.6 |
| Comparative Application Examples | 1 | 1434.4 | 1664.04 | 84.2 | 78.4 |
|  | 2 | 1465.7 | 1763.8 | 83.1 | 79.3 |

It can be seen from the above table that the initial charge-discharge efficiency is low and the cycle life is poor, and the 300-week capacity retention rate only reaches 79.3% in the comparative examples. The cylindrical single batteries utilizing composite silicon anode material prepared by the method described in the present application has an initial discharge capacity greater than 1000 mAh/g, an initial coulomb efficiency greater than 90.0% and a capacity retention rate after 300 cycles above 90%.

The applicant states that the present invention illustrates the detailed technological equipment and process of the present invention by the aforesaid examples, but the present invention is not limited by the aforesaid detailed technological equipment and process. That is to say, it does not mean that the present invention cannot be fulfilled unless relying on the aforesaid detailed technological equipment and process. Those skilled in the art shall know that, any amendments, equivalent changes to the product materials of the present invention, additions of auxiliary ingredients, and selections of any specific modes all fall within the protection scope and disclosure scope of the present invention.

The invention claimed is:

1. A composite silicon anode material, comprising a nano silicon, a nano composite layer coated on the surface of the nano silicon, and a conductive carbon layer uniformly coated outside the nano composite layer; the nano composite layer including a silicon oxide layer and a discrete metal alloy layer sequentially from the nano silicon outward, wherein the metal alloy is an alloy of metal elements and/or an alloy of a metal element and a non-metal element, wherein the metal element is any one, two or three selected from the group consisting of aluminum, titanium, tin, zinc, iron, antimony, and bismuth, and the non-metal element is any one or two selected from the group consisting of silicon and nitrogen, and wherein in the composite silicon anode material, the content of nano silicon is in the range of 5 wt % to 75 wt %.

2. The composite silicon anode material of claim 1, characterized in that the nano silicon has an average particle size of 1 nm to 500 nm.

3. The composite silicon anode material of claim 1, characterized in that the nano silicon is any one selected from the group consisting of nano silicon crystals, nano silicon non-crystals, and a combination of at least two of them.

4. The composite silicon anode material of claim 1, characterized in that in the composite silicon anode material, the content of conductive carbon is in the range of 5 wt % to 40 wt %.

5. The composite silicon anode material of claim 1, characterized in that the carbon of the conductive carbon layer includes any one selected from the group consisting of pyrolytic carbon, graphene, conductive carbon tube, carbon fiber, nano graphite, conductive carbon black, and a combination of at least two of them.

6. The composite silicon anode material of claim 1, characterized in that the nano composite layer has a thickness of 5 nm to 50 nm.

7. The composite silicon anode material of claim 1, characterized in that the silicon oxide is $SiO_x$, wherein X is in the range of 0.5 to 2.0.

8. A preparation method for the composite silicon anode material of claim 1, characterized in comprising the following steps:
(1) selecting nano silicon, carrying out heat treatment and homogeneous compounding treatment to obtain a first precursor;
(2) coating the first precursor with carbon to obtain a second precursor;
(3) carrying out modification post-treatment to the second precursor, and sintering to obtain a primary product of composite silicon anode material;
optionally, step (3) is followed by step (4):
carrying out pulverization, sieving and demagnetization to the primary product of composite silicon anode material obtained in step (3) to obtain a composite silicon anode material having a median particle diameter of 0.5 µm to 20.0 µm.

9. The preparation method of claim 8, characterized in that the heat treatment in step (1) is as follow: heat-treating the nano silicon in an oxidizing mixed gas.

10. The preparation method of claim 9, characterized in that the oxidizing mixed gas is a mixed gas of oxygen gas and an inactive gas, and the inactive gas is any one selected from the group consisting of nitrogen gas, helium gas, argon gas, neon gas, and a combination of at least two of them; the temperature for heat treatment is in the range of 300° C. to 1200° C.

11. The preparation method of claim 8, characterized in that the homogeneous compounding treatment in step (1) is as follow: under a protective atmosphere, carrying out ball milling with a metal alloy, followed by heat treatment.

12. The preparation method of claim 11, characterized in that the temperature for heat treatment is in the range of 500° C. to 1500° C.; the protective atmosphere is any one selected from the group consisting of nitrogen gas, helium gas, argon gas, neon gas, and a combination of at least two of them;
the metal alloy is any two selected from the group consisting of silicon powder, aluminum powder, titanium powder, nickel powder, tin powder, tungsten powder, iron powder, copper powder, manganese powder, cobalt powder, germanium powder, zinc powder, magnesium powder, gallium powder, and a combination of at least three of them;
the ball milling is dry ball milling and/or wet ball milling; the dry ball milling is carried out by any one of planetary ball mill, high speed stirring mill, tube mill, cone mill, rod mill, and sand mill.

13. The preparation method of claim 8, characterized in that the homogeneous compounding treatment in step (1) is as follow: under a reducing mixed atmosphere, mixing with the metal alloy and carrying out heat treatment.

14. The preparation method of claim 13, characterized in that the metal alloy is any one selected from the group consisting of aluminum salt, titanium salt, iron salt, tin salt, copper salt, manganese salt, cobalt salt, germanium salts, zinc salt, magnesium salt, aluminum trioxide, titanium dioxide, tin dioxide, copper oxide, and a mixture of at least two of them;
the reducing mixed atmosphere is a mixture of ammonia gas and an inactive gas; and the inactive gas is any one selected from the group consisting of nitrogen gas, helium gas, argon gas, neon gas, and a combination of at least two of them;
the temperature for heat treatment is in the range of 500° C. to 1500° C.

15. The preparation method of claim 8, characterized in that the method for carbon coating in step (2) is gas phase coating, liquid phase coating or solid phase coating.

16. The preparation method of claim 8, characterized in that the modification post-treatment in step (3) is selected from any one of fusion treatment, cold press treatment, hot press treatment, or isostatic press treatment; and is carried out by a fusion machine, a forging press, a roller machine, an extruder, a punch press, or an isostatic press equipment.

17. The preparation method of claim 8, characterized in that the sintering in step (3) is performed under a protective atmosphere which is any one selected from the group consisting of nitrogen gas, helium gas, neon gas, argon gas, krypton gas, xenon gas, and a combination of at least two of them;
the temperature for sintering in step (3) is in the range of 500° C. to 1200° C.

18. A lithium ion battery comprising the composite silicon anode material of claim 1.

* * * * *